United States Patent [19]

Fitzgibbon et al.

[11] 4,355,334
[45] Oct. 19, 1982

[54] DIMMER AND DIMMER OVERRIDE CONTROL FOR A DISPLAY DEVICE

[75] Inventors: James J. Fitzgibbon, Lombard; Leroy Sutton, Wheeling, both of Ill.

[73] Assignee: Zenith Radio Corporation, Glenview, Ill.

[21] Appl. No.: 268,441

[22] Filed: May 29, 1981

[51] Int. Cl.³ ............................ H04N 5/20; H04N 5/58
[52] U.S. Cl. .................................................. 358/168
[58] Field of Search ............... 358/160, 168, 169, 184, 358/188, 242, 243

[56] References Cited

FOREIGN PATENT DOCUMENTS 52-21724 2/1977 Japan ........................... 358/168

Primary Examiner—Robert L. Richardson

[57] ABSTRACT

A dimmer and dimmer override control is described for adjusting the amplitude of a video signal applied to a video display device. The control includes an amplifier for amplifying a video input signal, a light sensor for generating a dimmer control signal corresponding to the intensity of ambient light, and a transistor clipping circuit which clips the video signal at levels which vary as a function of the amplitude of the dimmer control signal. The clipping action is defeated by another transistor circuit which responds to a dimmer override signal for disabling the transistor clipping circuit.

8 Claims, 2 Drawing Figures

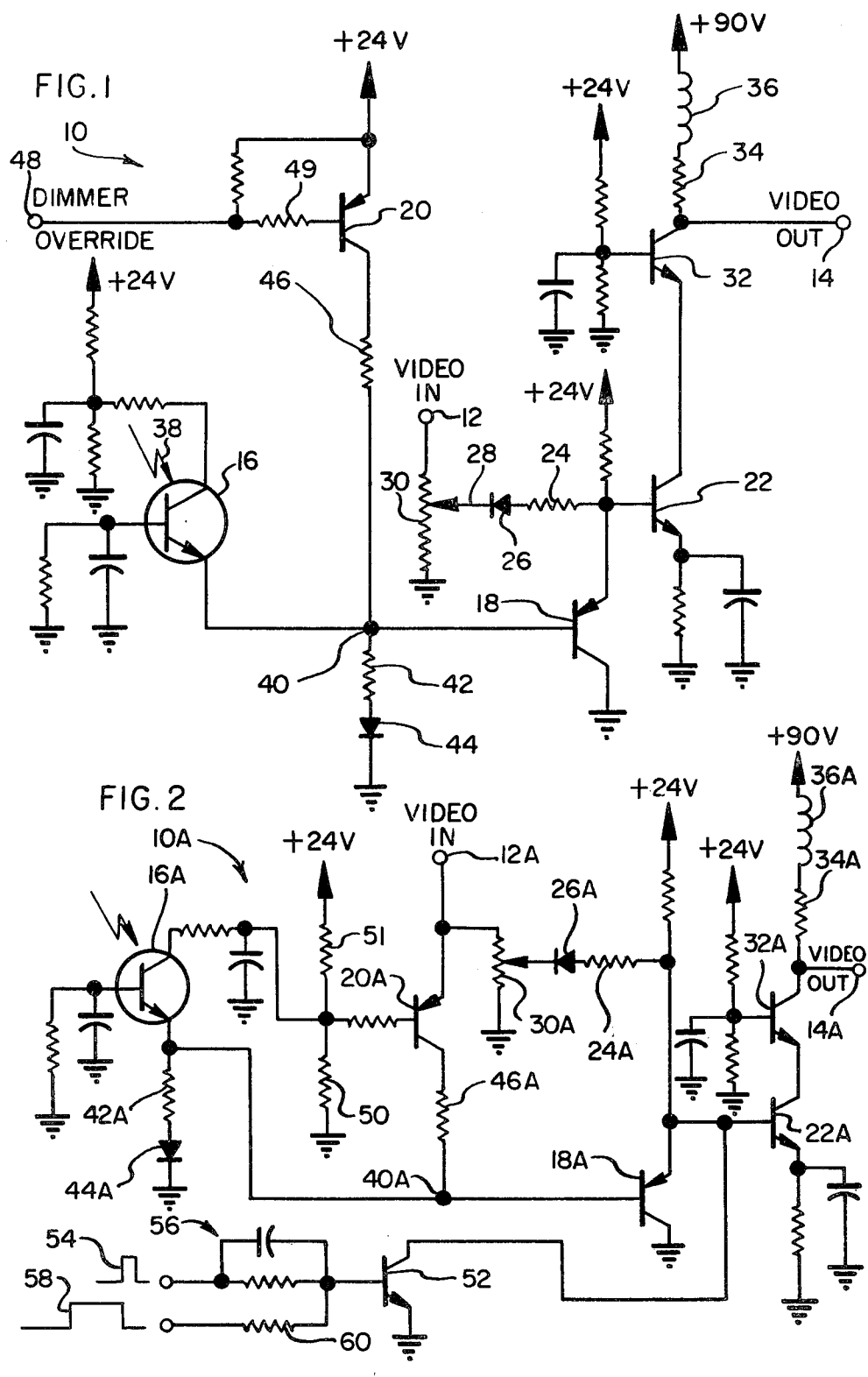

DIMMER AND DIMMER OVERRIDE CONTROL FOR A DISPLAY DEVICE

BACKGROUND OF THE INVENTION

This invention is directed to an improved dimmer control and dimmer override for use with a display device such as a CRT (cathode ray tube).

CRTs are frequently used to display graphics and other types of video under ambient light conditions which can vary greatly. Accordingly, it is helpful if the CRT is controlled by a dimmer so that image brightness is increased as the intensity of ambient light increases. When the intensity of ambient light decreases, the brightness of the image may be correspondingly decreased.

Under certain conditions, however, it is preferred that the CRT image be at maximum brightness, irrespective of ambient light conditions. For example, when the CRT is to display a warning or emergency message, a bright image is desired to ensure that the emergency message is easily readable. This override of the dimming function also helps to highlight the emergency message so it is more easily distinguished from a routine message.

Another criteria for CRT controls which provide the functions described above is that they be simple, reliable, and inexpensive, particularly for high volume consumer applications.

Accordingly, it is a general object of the invention to provide an improved dimmer control and dimmer override for a display device such as a cathode ray tube.

It is a more specific object of the invention to provide a dimmer and dimmer override control which is relatively simple, inexpensive, and reliable.

BRIEF DESCRIPTION OF THE FIGURES

The objects stated above and other objects of the invention are set forth more particularly in the following detailed description of the accompanying drawings, of which:

FIG. 1 is a schematic diagram of a dimmer and dimmer override control embodying various aspects of the invention; and FIG. 2 is a schematic diagram of another embodiment of the invention.

DESCRIPTION OF THE PREFERRED EMBODIMENT

Referring to FIG. 1, a dimmer and dimmer override control 10 is shown for use in controlling the amplitude of a video signal applied to a CRT (not shown) or any other type of display device. In this embodiment, an input video signal is applied to a terminal 12 and an amplified video signal is developed at an output terminal 14. As described in more detail below, the amplitude of the video signal at terminal 14 is controlled by a light sensor 16 and a video clipping transistor 18. Override of the clipping function is provided by another transistor 20.

The illustrated embodiment includes a cascode amplifier comprising an input transistor 22 whose base receives the video signal via a resistor 24 and a diode 26. The diode may be connected to the wiper arm 28 of a variable resistor 30 to set the video level at the output terminal 14.

The collector of the transistor 22 couples to the emitter of an output transistor 32 whose collector is coupled to a resistor 34, a coil 36 and the output terminal 14.

To control the amplitude of the signal at terminal 14 under various ambient lighting conditions, the sensor 16 (a light sensitive transistor, for example) is situated so as to receive ambient light indicated at 38, and to develop a dimmer control signal at a node 40 for varying the bias on the transistor 18. Thus, as the intensity of ambient light increases, the sensor 16 conducts harder to raise the potential at the node 40. The converse occurs as the intensity of ambient light decreases. Suitable biasing resistors and filter capacitors may be coupled to the base and collector of the sensor 16 as shown to establish a selected operating condition for the sensor.

The clipping transistor 18 may be of the PNP type with its collector grounded, its emitter coupled to the base of the transistor 22, and its base coupled to the node 40. A resistor 42 and a diode 44 may be coupled between ground and the node 40. With this arrangement, the transistor 18 is non-conductive in the absence of a video signal. However, when a video signal of sufficient amplitude appears at the base of the transistor 22, the transistor 18 conducts and reduces the amplitude of the video signal developed at output terminal 14. This effect is achieved as follows. Under strong ambient light conditions, the sensor 16 develops a relatively high positive voltage at the node 40. This reverse biases the transistor 18 so that video signals at the base of transistor 22 cannot turn on the transistor 18. Hence, those video signals do not become clipped and appear at a relatively large amplitude at the terminal 14. As the intensity of ambient light decreases, the amplitude of the control signal developed by sensor 16 decreases. Consequently, the reverse bias on transistor 18 is removed so that the relatively large amplitude video signals at the base of transistor 22 now turn on the transistor 18. Hence, they are clipped and a reduced amplitude video output is developed to produce a dimmer image. Under conditions of intermediate ambient lighting, large amplitude video signals may be clipped at their tips, but less clipping occurs than during higher level lighting conditions. It can be seen, therefore, that the clipping level of the transistor 18 varies according to ambient light conditions.

Where the video input at terminal 12 corresponds to an emergency or warning message, its amplitude is automatically raised conventionally by a video generator. When this occurs, it is desirable to override the previously described clipping function so that a large amplitude video output is generated, irrespective of ambient lighting conditions. For this purpose, the collector of transistor 20 is coupled via a resistor 46 to the node 40, its emitter is coupled to a voltage source, and its base is coupled to a terminal 48 via a resistor 49 for receiving a dimmer override signal. The dimmer override signal may be an open collector pull down which occurs concurrently with a large amplitude video warning signal. In response to the dimmer override signal, the transistor 20 conducts to raise the voltage at node 40 to reverse bias the transistor 18 so that it cannot be turned on by large amplitude video signals at the base of transistor 22. Consequently, the clipping function is defeated, and a large amplitude video warning signal appears at terminal 14.

It should be understood that the CRT may display emergency and non-emergency messages or graphics concurrently. However, the dimmer override function only operates on an emergency message. Thus, the emergency message appears as the brighter of the two messages and, therefore, easily directs a viewer's attention to it.

Referring to FIG. 2, components thereof which correspond to similarly functioning components of FIG. 1 have the same reference numeral followed by the character "A". In this embodiment, the video amplifier and the light sensor are identical to those shown in FIG. 1. A major difference between the controls 10A and 10 is that the former is adapted to use the video signal itself as the dimmer override signal. For this purpose, the emitter of the transistor 20A is coupled to the video input terminal 12A and its base is coupled to a DC potential established by resistors 50 and 51. A resistor 46A couples the collector of transistor 20A to node 40A.

Non-emergency video signals at terminal 12A may have an amplitude of 2 volts, for example. Emergency video signals may have an amplitude of about 4 volts. To distinguish between these video signals, the DC potential at the base of the transistor 20 is selected to hold the transistor 20A off when the non-emergency video signals arrive, and to turn the transistor 20A on when the larger amplitude emergency video signals arrive. When the latter event occurs, the transistor 20A conducts to raise the potential of node 40A for biasing the transistor 18A to a level which permits maximum brightness to be obtained without saturating the amplifier. Thus, the clipping action of transistor 18A is controlled to provide a maximum video output, and the emergency video is output at terminal 14A at a large amplitude. When relatively smaller amplitude (non-emergency) video arrives at terminal 12A, the DC potential at its base holds transistor 20A off so that the dimming function occurs as previously described. Thus, the transistor 20A acts as a comparator to distinguish between emergency and non-emergency signals.

In applications where it is desirable to blank the cathode ray tube during horizontal and/or vertical retrace intervals, this may be accomplished by including another transistor 52. Horizontal rate pulses 54 may be coupled to the base of transistor 52 via an R-C network 56 and vertical rate pulses 58 may be coupled to its base via a resistor 60. The collector of transistor 52 may be coupled to the base of transistor 22A to turn it off in the presence of the horizontal and vertical rate pulses. Similar circuitry may be coupled to the base of transistor 22 (FIG. 1) to blank the amplifier in the control 10.

From the foregoing description, it will be appreciated that the dimmer and override controls are relatively simple and inexpensive. Consequently, they may be used in high volume consumer applications such as displays which show the operating characteristics of vehicles. Many other such applications will be apparent.

Although the invention has been described in terms of preferred structures, it will be obvious to those skilled in the art that many modifications and alterations may be made without departing from the invention. Accordingly, it is intended that all such modifications and alterations be considered as within the spirit and scope of the invention as defined by the appended claims.

What is claimed is:

1. A dimmer and dimmer override control for adjusting the amplitude of a video signal received by a video display device, comprising:

an amplifier for receiving and amplifying the video signal;

a light sensor for generating a dimmer control signal corresponding to the intensity of ambient light;

first transistor means responsive to the dimmer control signal and coupled to the amplifier so as to clip the video signal and thereby reduce the amplitude of the amplified video signal as the intensity of ambient light decreases; and second transistor means coupled to the first transistor means and adapted to receive a dimmer override signal for at least partially disabling the clipping action of the first transistor means so that a large amplitude video signal is output by the amplifier irrespective of the intensity of ambient light.

2. A control as set forth in claim 1 wherein the amplifier includes at least one input transistor receiving the video signal at its base, and wherein said first transistor means includes a clipping transistor whose base receives the dimmer control signal and which includes another terminal coupled to the base of the input transistor so as to clip video signals in response to the dimmer control signal.

3. A control as set forth in claim 2 wherein said second transistor means includes a transistor whose collector is coupled to the base of the clipping transistor and whose base receives the override signal for altering the clipping level of the clipping transistor.

4. A control as set forth in claim 3 including a blanking transistor coupled to the amplifier and responsive to blanking signals for turning the amplifier off for the duration of the blanking signals.

5. A dimmer control as set forth in claim 1 wherein the dimmer override signal applied to the second transistor means constitutes the video signal, and wherein the second transistor means is responsive to a selected, relatively large amplitude of the video signal for at least partially disabling the clipping action of the first transistor means.

6. A dimmer and dimmer override control for adjusting the amplitude of a video signal received by a video display device, comprising:

an amplifier having at least one input transistor receiving the video signal at its base;

a light sensor for generating a dimmer control signal corresponding to the intensity of ambient light;

a clipping transistor whose base receives the dimmer control signal and whose emitter is coupled to the base of the input transistor so as to clip the video signal in response to the dimmer control signal and thereby reduce the output of the amplifier as the intensity of ambient light decreases; and a second transistor whose collector is coupled to the base of the clipping transistor and whose base receives an override signal for at least partially disabling the clipping action so that a large amplitude video signal is output by the amplifier irrespective of the intensity of ambient light.

7. A dimmer and dimmer override control for adjusting the amplitude of a video signal received by a video display device, comprising:

an amplifier having at least one input transistor receiving the video signal at its base;

a light sensor for generating a dimmer control signal corresponding to the intensity of ambient light;

a clipping transistor whose base receives the dimmer control signal and whose emitter is coupled to the base of the input transistor so as to clip the video signal in response to the dimmer control signal and thereby reduce the output of the amplifier as the intensity of ambient light decreases; and a second transistor whose emitter receives the video signal, whose base receives a selected DC potential and whose collector is coupled to the base of the clipping transistor so that video signals whose amplitude exceeds the DC potential turn the second transistor on for at least partially disabling the clipping action irrespective of the intensity of ambient light.

8. A dimmer and dimmer override control for adjusting the amplitude of a video signal received by a video display device, comprising:

a light sensor for generating a dimmer control signal corresponding to the intensity of ambient light;

circuit means receiving the video signal and responsive to the dimmer control signal for developing an amplified video signal whose amplitude is controlled by the dimmer control signal; and a dimmer override transistor whose emitter receives the video signal, whose base receives a DC potential and whose collector is coupled to said circuit means so as to defeat the effect of the dimmer control signal when a relatively large video signal is received whose amplitude exceeds the DC potential.

* * * * *